(12) United States Patent
Madaiah (10) Patent No.: US 11,381,454 B2
(45) Date of Patent: Jul. 5, 2022

(54) SYSTEM AND METHOD FOR NETWORK RESOURCE OPTIMIZATION

(71) Applicant: TEJAS NETWORKS LTD., Bangalore (IN)

(72) Inventor: Vinod Kumar Madaiah, Bangalore (IN)

(73) Assignee: Tejas Networks Ltd.

( * ) Notice: Subject to any disclaimer, the term of this patent is extended or adjusted under 35 U.S.C. 154(b) by 209 days.

(21) Appl. No.: 15/622,148

(22) Filed: Jun. 14, 2017

(65) Prior Publication Data

US 2017/0366400 A1 Dec. 21, 2017

(30) Foreign Application Priority Data

Jun. 15, 2016 (IN) .............................. 201641020492

(51) Int. Cl.
| | | |
|---|---|---|
| *H04L 41/0823* | (2022.01) | |
| *H04L 9/40* | (2022.01) | |
| *H04L 67/14* | (2022.01) | |
| *H04W 76/12* | (2018.01) | |
| *H04W 48/00* | (2009.01) | |
| *H04W 24/02* | (2009.01) | |
| *G06F 21/60* | (2013.01) | |
| *H04W 12/03* | (2021.01) | |
| *H04W 12/40* | (2021.01) | |
| *H04W 12/06* | (2021.01) | |
| *H04W 12/069* | (2021.01) | |
| *H04W 12/084* | (2021.01) | |
| *G06F 21/31* | (2013.01) | |
| *H04W 92/14* | (2009.01) | |
| *H04W 92/12* | (2009.01) | |
| *H04W 12/63* | (2021.01) | |
| *H04W 12/71* | (2021.01) | |
| *H04W 12/72* | (2021.01) | |

(52) U.S. Cl.
CPC ........ *H04L 41/0823* (2013.01); *G06F 21/604* (2013.01); *H04L 63/08* (2013.01); *H04L 67/14* (2013.01); *H04W 12/03* (2021.01); *H04W 12/068* (2021.01); *H04W 12/069* (2021.01); *H04W 12/084* (2021.01); *H04W 12/40* (2021.01); *H04W 24/02* (2013.01); *H04W 48/00* (2013.01); *H04W 76/12* (2018.02); *G06F 21/31* (2013.01); *H04W 12/63* (2021.01); *H04W 12/71* (2021.01); *H04W 12/72* (2021.01); *H04W 92/12* (2013.01); *H04W 92/14* (2013.01)

(58) Field of Classification Search
CPC .................................................... H04L 41/0823
USPC ......................................................... 709/228
See application file for complete search history.

(56) References Cited

U.S. PATENT DOCUMENTS 9,210,596 B1 * 12/2015 Chen ..................... H04W 76/19
2012/0008554 A1 * 1/2012 Kim ...................... H04W 76/12
370/328

(Continued)

*Primary Examiner* — Tonia L Dollinger
*Assistant Examiner* — Ishrat Rashid (57) ABSTRACT

The present disclosure relates to establishment of communication between a computing devices and a gateway via a Mobility Management Entity (MME) and a base station, wherein a communication channel is initially established between the computing device and the base station, based on which the MME performs authentication of the computing device and also creates an Evolved Packet System (EPS) bearer between the computing device and the gateway.

8 Claims, 4 Drawing Sheets

(56) References Cited

U.S. PATENT DOCUMENTS

| | | | |
|---|---|---|---|
| 2013/0064158 A1* | 3/2013 | Sundell | H04W 76/10 370/311 |
| 2014/0301274 A1* | 10/2014 | Touati | H04W 76/12 370/328 |
| 2014/0335830 A1* | 11/2014 | Wu | H04W 12/069 455/411 |
| 2016/0366707 A1* | 12/2016 | Sirotkin | H04W 12/02 |
| 2017/0251421 A1* | 8/2017 | Albasheir | H04W 40/04 |
| 2019/0053034 A1* | 2/2019 | Kim | H04W 8/08 |

* cited by examiner

SYSTEM AND METHOD FOR NETWORK RESOURCE OPTIMIZATION

TECHNICAL FIELD

Embodiments of the present disclosure relate to network resource optimization in communication networks, and particularly, but not exclusively, to a system and method for utilizing communication technologies, like LTE, to optimize network equipment requirements in communication.

BACKGROUND

Background description includes information that may be useful in understanding the present invention. It is not an admission that any of the information provided herein is prior art or relevant to the presently claimed invention, or that any publication specifically or implicitly referenced is prior art.

In recent years, communication using communication devices has become an integral part of human life. Communication devices, such as computers, mobile phones, televisions, radios, and the like, are associated to communication networks using one or more communication technologies. The communication networks comprise various network resources, such as signal transceivers, installed to provide connection and enable communication with the communication devices.

Internet based services and applications are rapidly growing and are fundamental to fulfil people's needs in areas such as communication, banking, shopping, information, education and entertainment. Typically, Internet users use two major types of internet services: wired broadband Internet and wireless broadband Internet. Internet uses a large variety and quantity of network equipment for performing communication.

With the development of wireless communications technology, especially 4G technology, along with global mobile network operators' rapid expansion, number of users of wireless networks is also growing rapidly. Deployment of network resources in a communication network requires consideration of several parameters including Quality of Service (QOS), minimum coverage area, etc.

Existing communication architectures use a large variety and quantity of network equipment for performing communication, which leads multiple technologies that need to be managed by network operator(s). Further, bandwidth on-demand feature needs separate technology such as software defined networking (SDN) or complex and proprietary software (LTE software for bandwidth on demand is standardized by 3GPP). Also, mobility of DSL host is not supported within the same operator or across different operators as is required in roaming. These issues cause a large number and variety of equipment in a communication network and therefore optimization of network resources by reducing the number and variety of equipment deployed is desired.

Therefore, there is a need for an improved system and method that can optimize network resources in communication networks like LTE network to ensure proper network resource utilization and efficient operation of the communication network for meeting the users requirements.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

OBJECTS OF THE INVENTION

It is an object of the present disclosure to provide a system and method for utilizing communication technologies such as LTE to optimize network equipment requirements in a communication network.

It is another object of the present disclosure to provide a system and method to ensure proper network resource utilization and efficient operation of communication network.

It is another object of the present disclosure to provide a system and method for establishment of communication between one or more computing devices and one or more gateways via mobility management entity (MME) and a base station.

It is yet another object of the present disclosure to provide a system and method for authentication of the computing device to be performed by mobility management entity (MME) to ensure efficient operation of the communication network.

It is still another object of the present disclosure to a provide system and method for creation of an Evolved Packet System (EPS) bearer by mobility management entity (MME) between one or more computing devices and one or more gateways.

SUMMARY

Aspects of the present disclosure relate to the field of network resource optimization in communication networks. The disclosure particularly relates to a system and method for utilizing communication technologies such as LTE to optimize network equipment requirements in communication.

An aspect of the present disclosure provides a system (also referred to as "a network optimization system") for enabling optimization of network resources in a service area of a communication network, wherein the system, in an exemplary aspect, can include a connection establishment module that can be configured to establish a connection between a computing device and base station such as Evolved Node B (eNodeB or eNB), wherein the computing device may include, but is not limited to, a computer, one or more discrete servers, a mainframe computer, and the like. Network optimization system may provide for network equipment optimization in a communication network, such as a GSM network, a UMTS network, a PCS network, a TDMA network, a CDMA network, a NGN, a broadcast network, an IP-based network, a WiMAX network, and the like.

In an aspect, connection between the computing device and the base station such as Evolved Node B (eNodeB or eNB) can be a wired connection.

In an aspect, network optimization system of the present disclosure can further include an authentication module that can be configured to authenticate the computing device, wherein, in an aspect, the authentication can be performed by a mobility management entity (MME) that can use a unique identity of the computing device (for instance, a unique identity associated with SIM in a mobile/smart device/phone) so as to enable the computing device to access the communication network In another aspect, the authentication module can authorize the computing device to communicate wirelessly to access the communication network. In an exemplary embodiment, authentication module may be configured as part of an authentication, authorization, and accounting (AAA) server.

In an aspect, system of the present disclosure can further include an Evolved Packet System (EPS) bearer creation module that can be configured to enable the mobility management entity (MME) to generate an evolved packet system (EPS) bearer between the computing device and the gateway such as SGW/PGW.

In an aspect, technical solution disclosed in the instant disclosure enables optimization of network equipment in a communication network such as LTE, GSM network, a UMTS network, a PCS network, a TDMA network, a CDMA network, a NGN, a broadcast network, an IP-based network, GPON, Ethernet network, a WiMAX network, and the like based on connection establishment between computing device and base station such as Evolved Node B (eNodeB or eNB), authentication of the computing device, and packet carrier creation. As the proposed system runs optimized network resources in a communication network such as LTE, it significantly imparts a technical impact through reduction in network resources than may be otherwise required.

It would be appreciated that although aspects of the present disclosure have been explained with respect to network resource optimization in communication technology, the present invention is not limited to the same in any manner whatsoever and any other form of communication technology is completely covered within the scope of the present disclosure. For example, the wired connection includes Fiber or cable. Further, the wired connection could be an input to collocated GPON OLT card thereby a single wire can service multiple GPON ONT or users.

Furthermore, although aspects of the present disclosure have been explained with respect to users, such users may be individual, individuals, or legal entities, and therefore any type/form of users is completely within the scope of the present disclosure.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described as a system and method for utilizing communication technologies like LTE to optimize network equipment requirements, it should be appreciated that the same has been done merely to illustrate the disclosure in an exemplary manner and any other purpose or function for which the explained structure or configuration can be used is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any electronic code generator shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Aspects of the present disclosure relate to the field of network resource optimization in communication networks. The disclosure particularly relates to a system and method for utilizing communication technologies such as LTE to optimize network equipment requirements in communication.

An aspect of the present disclosure provides a system (also referred to as "a network optimization system") for enabling optimization of network resources in a service area of a communication network, wherein the system, in an exemplary aspect, can include a connection establishment module that can be configured to establish a connection between a computing device and base station such as Evolved Node B (eNodeB or eNB), wherein the computing device may include, but is not limited to, a computer, one or more discrete servers, a mainframe computer, and the like. Network optimization system may provide for network equipment optimization in a communication network, such as a GSM network, a UMTS network, a PCS network, a TDMA network, a CDMA network, a NGN, a broadcast network, an IP-based network, GPON, Ethernet network, a WiMAX network, and the like.

In an aspect, connection between the computing device and the base station such as Evolved Node B (eNodeB or eNB) can be a wired (Fiber, Copper or Cable) connection. Further, the wired connection could be an input to collocated GPON OLT card thereby a single wire can service and provide QoS to multiple GPON ONT or users.

In an aspect, network optimization system of the present disclosure can further include an authentication module that can be configured to authenticate the computing device, wherein, in an aspect, the authentication can be performed by a mobility management entity (MME) that can use a unique identity of the computing device (for instance, a unique identity associated with SIM in a mobile/smart device/phone) so as to enable the computing device to access the communication network.

In another aspect, the authentication module can authorize the computing device to communicate wirelessly to access the communication network. In an exemplary embodiment, authentication module may be configured as part of an authentication, authorization, and accounting (AAA) server.

In an aspect, system of the present disclosure can further include an Evolved Packet System (EPS) bearer creation module that can be configured to enable the mobility management entity (MME) to generate an evolved packet system (EPS) bearer between the computing device and the gateway such as SGW/PGW.

In an aspect, technical solution disclosed in the instant disclosure enables optimization of network equipment in a communication network such as LTE, GSM network, a UMTS network, a PCS network, a TDMA network, a CDMA network, a NGN, a broadcast network, an IP-based network, a WiMAX network, and the like based on connection establishment between computing device and base station such as Evolved Node B (eNodeB or eNB), authentication of the computing device, and packet carrier creation. As the proposed system runs optimized network resources in a communication network such as LTE, it significantly imparts a technical impact through reduction in network resources than may be otherwise required.

It would be appreciated that although aspects of the present disclosure have been explained with respect to a network optimization system in communication technology, the present invention is not limited to the same in any manner whatsoever and any other environment in which aspects of the present disclosure can be implemented is well within the scope of the present disclosure.

Figure 1:
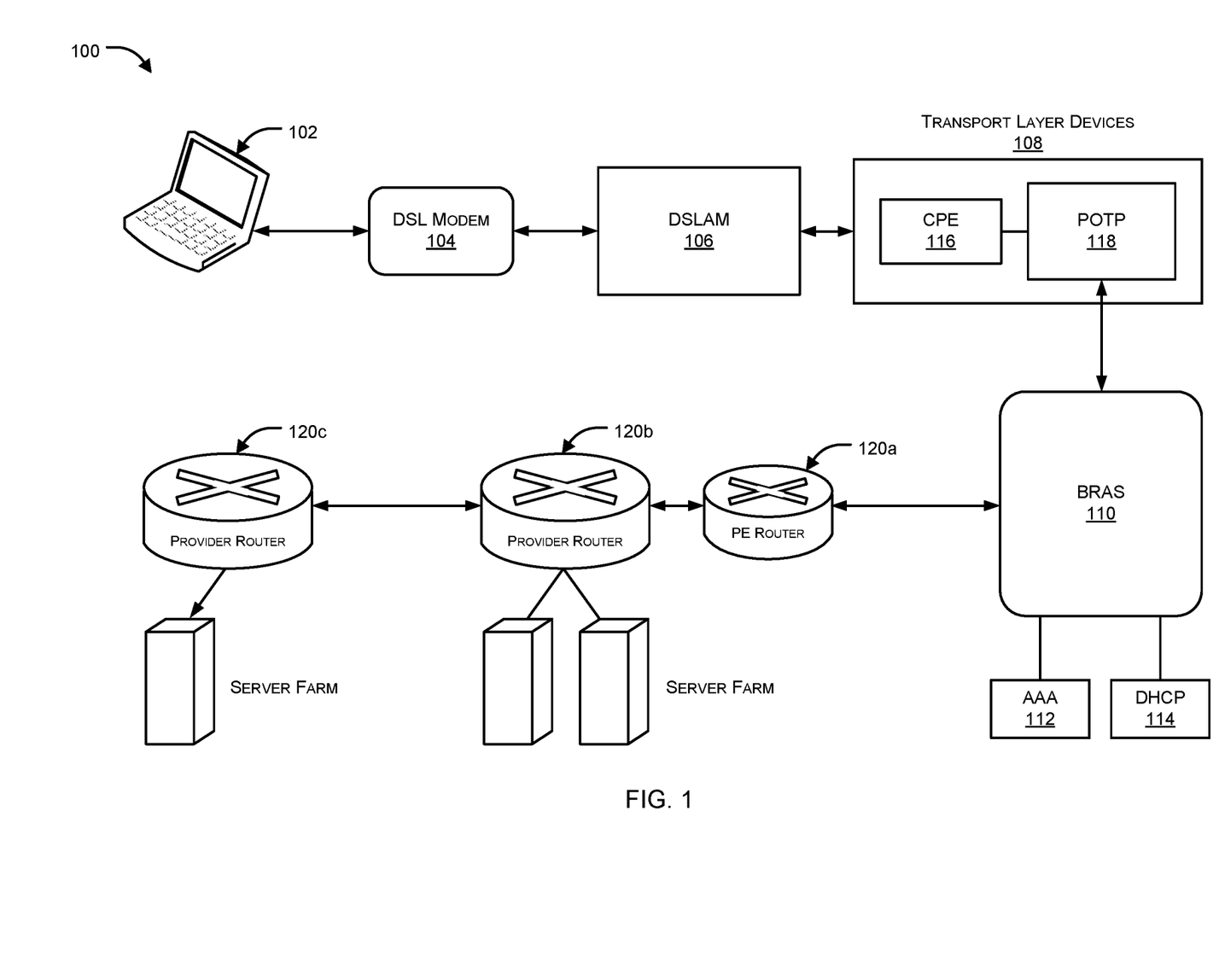
FIG. 1 illustrates an existing mechanism for using DSL technology for communication.

FIG. 1 illustrates an existing mechanism for using DSL technology for communication. In an embodiment, FIG. 1 illustrates a communication network system utilizing network resource.

The present subject matter is explained considering an existing mechanism for connection establishment for local users via broadband remote access server (BRAS). It may be understood that local users may use a variety of computing systems such as a laptop computer, a desktop computer a notebook, a workstation, a mainframe computer, a server, a network server, and the like and that DSL technology or GPON technology may be accessed by multiple users.

In one implementation, a computing device 102 can be connected to a digital subscriber line (DSL) modem 104 that transfers information received from the computing device 102 over telephone or cable line to the broadband remote access server (BRAS) 110. In exemplary embodiments, computing device 102 can be selected from a variety of computing systems such as a laptop computer, a mobile phone, a smart phone, a wearable device, a desktop computer a notebook, a workstation, a mainframe computer, a server, a network server, and the like. In another embodiment, the digital subscriber line (DSL) modem 104 can be a device configured to connect a computing device 102 or router to a telephone line that provides the digital subscriber line service for connectivity to the Internet.

In another embodiment, DSL modem 104 can be connected to broadband remote access server (BRAS) 110 via a digital subscriber line access multiplexer (DSLAM) 106 and transport layer devices 108 to transfer information received from the computing device 102. In an embodiment, transport layer devices 108 can include customer-premises equipment (CPE) 116 and a hardware POTP 118 to support TDM and Ethernet as line interfaces. In an exemplary embodiment, Customer premises equipment (CPE) can be telephone or other service provider equipment such as Telephone handset, cable TV set-top box, and Digital Subscriber Line router that is located on the customer's premises (physical location) rather than on the provider's premises or in between.

In another embodiment, an authentication server 112 such as AAA server can be configured with the broadband remote access server (BRAS) 110 to authenticate the DSL modem 104. An authentication server 112 can be an application that facilitates authentication of an entity that attempts to access a network. Such an entity may be a human user or another server. An authentication server 112 can reside in a dedicated computer, an Ethernet switch, an access point or a network access server.

In another embodiment, broadband remote access server (BRAS) 110 can also use dynamic host configuration protocol (DHCP) 114 to automatically assign an IP address to the DSL modem 104. Further, BRAS 110 can be connected with a provider edge (PE) router 120a to transfer received information from a first network service provider to a second network service provider. PE router 120a is further connected to one or more provider routers such as 120b and 120c. Therefore, even in cases where computing devices 102 (such as mobile phone, laptop, PC, tablet PC, PDA, smart phone, among other like network enabled computing devices) that try to communicate with each other are part of the same local network (i.e. have the same network service provider, or are part of a local area network (LAN)), they need to route their communication requests through broadband remote access server (BRAS) and/or provider edge routers, leading to above-mentioned performance, operational, and commercial limitations. Note that though the example is with respect to DSL technology, similar example can be provided with respect to GPON. DSL technology is widespread in United States, whereas GPON is widespread technology in India.

Figure 2:
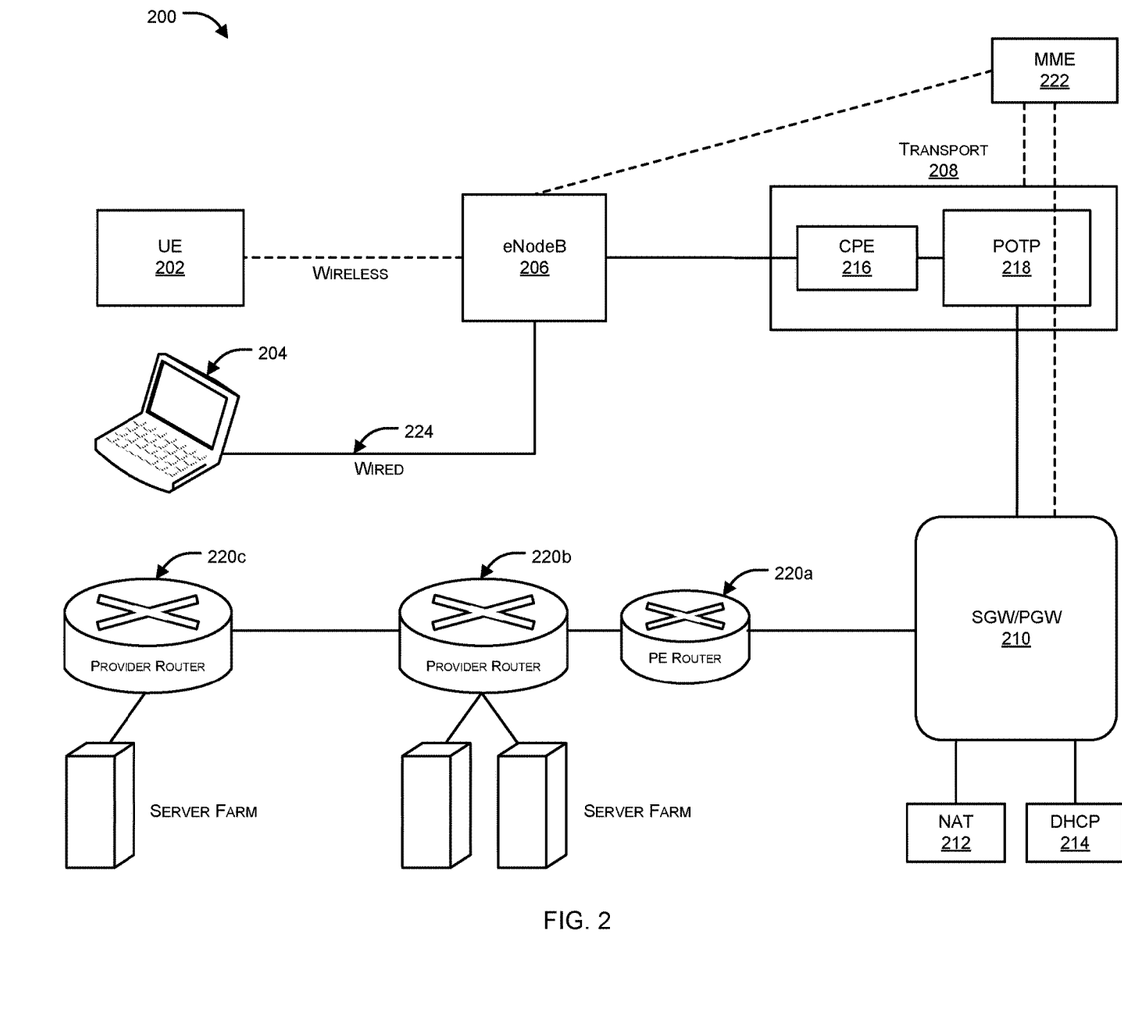
FIG. 2 illustrates an exemplary block diagram for connection establishment via a mobility management entity (MME) in accordance with embodiments of the present disclosure.

FIG. 2 illustrates an exemplary block diagram 200 for connection establishment via a mobility management entity (MME) in accordance with embodiments of the present disclosure. FIG. 2 illustrates an exemplary process of communication between a computing device 202/204 and a gateway 210 such as Serving Gateway (SGW)/Packet Data Network Gateway (PGW) via a base station 206 such as Evolved Node B (eNodeB or eNB) and mobility management entity (MME).

In one embodiment, connection between a computing device 202/204 and a base station 206 such as an Evolved Node B (eNodeB or eNB) can be established via a mobility management entity (MME) 222.

In one embodiment, the computing device 204 and a gateway 210 such as Serving Gateway (SGW)/Packet Data Network Gateway (PGW) can be configured to communicate via eNodeB 206 and the mobility management entity (MME) 222. It would be appreciated that the gateway 210 such as SGW, PGW among others are completely exemplary in nature, and any other suitable gateways/servers can be utilized to enable aspects of the present disclosure, and all such possible gateways/servers are completely within the scope of the present disclosure. In another embodiment, mobility management entity (MME) 222 can include network component of the communication network such as LTE. Mobility management entity (MME) 222 can be configured to track current location of a computing device and to send location information to an analytics server (e.g. HLR/VLR not shown) for further processing. Mobility management entity (MME) 222 can be configured to authenticate/authorize user access control. Mobility management entity (MME) 222 can be configured to perform authentication by identifying the user to the communication network. In an exemplary embodiment, authentication can be password authentication, key authentication, and token based authentication. In another exemplary embodiment, the computing device 204 can be equipped with a subscriber identity module or subscriber identification module (SIM), where SIM can be associated with a globally unique identifier such as unique serial number (ICCID), international mobile subscriber identity (IMSI) number, security authentication and ciphering information, temporary information related to the computing device and a secure access key that can be further utilized for secure access of internet services. It would be appreciated that SIM's unique IDs such as international mobile subscriber identity (IMSI), unique serial number (ICCID) among others are completely exemplary in nature, and any other suitable unique identity can be utilized to enable aspects of the present disclosure.

In one of the embodiment, computing device 204 can be any or a combination of a laptop, a tablet PC, a general purpose computer, a mobile phone, a portable computing device, a smart phone, and the like, as known to a person ordinary skilled in the art. Further, eNodeB 206 can be configured to connect the gateway such as Serving Gateway (SGW)/Packet Data Network Gateway (PGW) 210 via transport layer devices 208, for transmission of data. Transport layer devices 208 can include customer-premises equipment (CPE) 216 and a hardware POTP 218 to support TDM and Ethernet as line interfaces. In an embodiment, the computing device 204 can be connected with base station such as eNodeB 206 via wired or wireless communication or any other communication means can be configured to enable aspects of the present disclosure. All such possible configurations/architectures are completely within the scope of the present disclosure. In an exemplary embodiment, the computing device 204 can be connected with the base station such as Evolved Node B (eNodeB or eNB) 206 using a Local Area Network (LAN).

In one of the embodiment, as the computing device 204 is connected over wire, it will not interfere with other computing devices and therefore intercell or intracell interference coordination is not required for such computing devices. A user equipment (UE) 202 such as a mobile phone may also be connected with the base station 206 wirelessly. In an alternate embodiment, one or more computing devices can be connected to one or more eNodeB to enable aspects of the present disclosure, and all such possible network configurations are completely within the scope of the present disclosure.

In another embodiment, the mobile management entity 222 can create an Evolved Packet System (EPS) bearer that can be configured to include a tunnel between the device 204 and the eNodeB 206 to transmit data. In one exemplary implementation, the tunnel can utilize a network protocol, including but not limited to, Multiprotocol Label Switching—Transport Profile (MPLS-TP), Provider Backbone Bridge Traffic Engineering (PBB-TE), and the like, as known to a person ordinarily skilled in the art.

In another embodiment, EPS bearer can be established when a User Equipment (UE) 202 or computing device 204 registers with the network. In another embodiment, the computing device 204 can be stationary for most of the time, which in turn can allow S5 bearer to be established from eNodeB 206 to PGW 210, exclusion of cells, optimization of a paging message with local warning alerts rather than limiting with Earthquake and Tsunami alerts, avoiding of PDCP stack, RLC stack and Timing alignment signalling, and use of Link Layer Control (LLC) as defined for Ethernet media access control (MAC).

In another embodiment, S5 bearer can be configured to provide connectivity between an Evolved Node B (eNodeB or eNB) and Home serving gateway.

In another embodiment, physical connectivity of the computing device 202/204 can be checked by continuity check messages or loss of signal at the base station such as eNodeB 206. In an exemplary embodiment, when a paging message containing voice/data call arrives at the mobility management entity (MME) 222 for a specific computing device 204 (that can be identified by the computing device's SIM, for example), the mobility management entity (MME) 222 can collect exact eNodeB details to which the computing device 204 is attached in order to send the paging message. Therefore, the paging message becomes a unicast paging message. Further, if the computing device 204 is disconnected from wired or wireless communication, eNodeB can inform to the mobility management entity (MME) 222 that the computing device 204 is unreachable. Unlike in wireless access, physical detachment can be learnt by continuity check messages or loss of signal at the eNodeB 206 and can be notified to the mobility management entity (MME) 222 proactively.

In an alternate embodiment, one or more computing devices can be connected to one or more eNodeB to enable aspects of the present disclosure, and all such possible network configurations are completely within the scope of the present disclosure.

In an exemplary embodiment, data transmission can be done in any of simplex mode, half duplex mode, or full duplex mode. It should be appreciated that the system called as eNodeB herein is different from the eNodeB defined by 3GPP standards setting organization. eNodeB herein has more functions than eNodeB defined by 3GPP.

Figure 3:
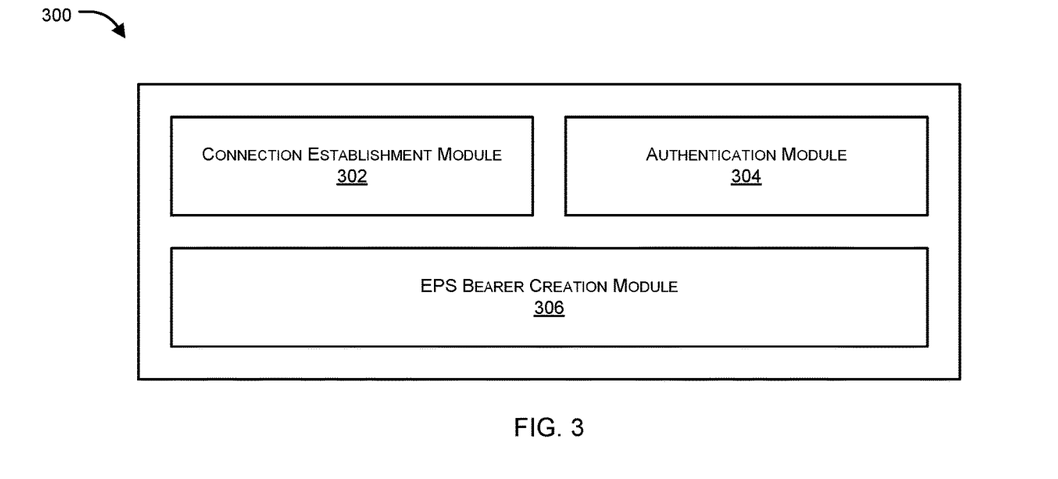
FIG. 3 illustrates exemplary functional modules of the proposed long term evolution (LTE) based communication system in accordance with an embodiment of the present disclosure.

FIG. 3 illustrates exemplary functional modules of the proposed LTE based communication in accordance with an embodiment of the present disclosure. In an aspect, system of the present disclosure can include a connection establishment module 302 that can be configured to enable establishment of a connection between a computing device and at least one base station, wherein the base station is an Evolved Node B (eNodeB or eNB). In an embodiment, connection can be a wired connection. In an aspect, module 302 can be configured in a mobility management entity (MME). The proposed system can further include an authentication module 304 that can be configured in the mobility management entity (MME) 222 and can authenticate one or more computing devices such as mobile phone by interacting with a (Home subscriber server) HSS, which can be used to support IMSI network entities by containing relevant information such as subscriber profiles and performing authentication and authorization of the user along with providing information about subscriber's location and IP information. This can be similar to GSM home location register (HLR) and Authentication center (AUC). In another embodiment, an AAA server can be configured to perform authentication, wherein the AAA server can be a server program that handles user requests for access computer resources and, for an enterprise, provide authentication, authorization, and accounting (AAA) services. AAA server typically interacts with network access and gateway servers and with databases and directories containing user information.

In an aspect, the proposed system can further include an Evolved Packet System (EPS) bearer creation module 306 that can be configured to enable creation of an Evolved Packet System (EPS) bearer between the computing device and a gateway such as SGW/PGW via the MME. In an aspect, the module 306 can be configured in the mobility management entity 222.

Figure 4:
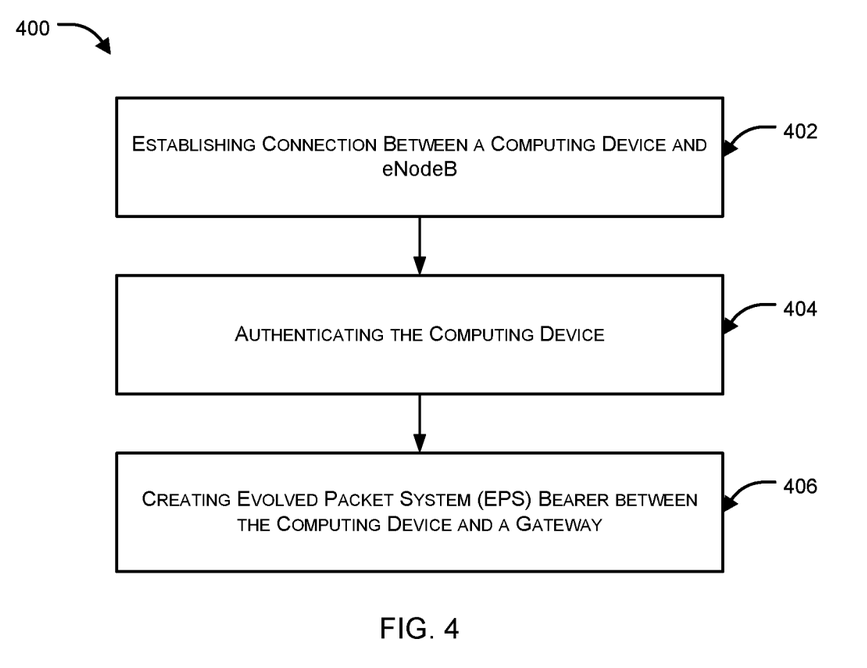
FIG. 4 illustrates an exemplary flow diagram depicting steps involved in optimizing network resource in communication network for network users, in accordance with an embodiment of the present disclosure

FIG. 4 illustrates an exemplary flow diagram depicting steps involved in optimizing network resources in a communication network for network users in accordance with an embodiment of the present disclosure. The method 400 may be described/implemented while adjusting network resource (s) for/in a communication network such as an LTE network. In an aspect, the proposed method 400 can include the steps of, at step 402, establishing connection between a computing device and a base station such as Evolved Node B (eNodeB or eNB); at step 404, authenticating the computing device via a mobility management entity (MME); and at step 406, creating, using the MME, a Evolved Packet System (EPS) bearer between the computing device and the gateway such as SGW/PGW.

The order in which the method 400 as described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof.

As used herein, and unless the context dictates otherwise, the term "communication network" is intended to include internet, LAN, WAN, Intranet or Cloud networks or any communication medium possible for interaction among the devices and with the server. Within the context of this document the "device" can be any computing or smart device such as, computers, laptops, smart phones, multimedia sets, tablets, etc. As used herein, the word sign up and registration can be used collectively or interchangeably either as "sign up" or "registration" having the same meaning unless the context dictates otherwise.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Advantages of the Invention

The present disclosure provides a system and method for utilizing communication technologies like LTE to optimize network equipment requirements in a communication network.

The present disclosure provides a system and method for establishing communication between one or more computing devices and one or more gateways via a Mobility management entity (MME) and a base station.

The present disclosure provides a system and method for performing authentication of one or more computing devices via the Mobility management entity (MME).

The present disclosure provides a system and method for provisioning bandwidth bandwidth-on-demand for computing devices over wire.

The present disclosure provides a system and method for allowing roaming within an ISP or between ISPs.

The present disclosure enables GPON and DSL users to have guaranteed QoS till the gateway.

What is claimed is:

1. A system configured in a Mobility Management Entity (MME), the system comprising:
a non-transitory storage device having embodied therein one or more routines operable to optimize communication between a computing device and a gateway wherein the computing device is equipped with a subscriber identification module (SIM); and
one or more processors coupled to the non-transitory storage device and operable to execute the one or more routines, wherein the one or more routines include:
a connection establishment module, which when executed by the one or more processors, enables establishment of connection between the computing device and a base station, wherein the connectivity of the computing device is checked through information received from the base station to which the computing device is connected;
an authentication module, which when executed by the one or more processors, authenticates the computing device based on an access key, to authenticate user access control and to access a communication network, wherein the access key is a unique identifier of the computing device; and
an Evolved Packet System (EPS) bearer creation module which, when executed by the one or more processors, creates an Evolved Packet System (EPS) bearer between the computing device and the gateway based on successful authentication of the computing device, to optimize communication between the computing device and the gateway, wherein a bandwidth is provisioned on-demand for the computing device,
wherein the EPS bearer includes a tunnel between the computing device and the base station for transmitting data, wherein the gateway is any or a combination of a Serving Gateway (SGW) and a Packet Data Network Gateway (PGW), wherein the base station is configured to connect the gateway via transport layer devices, wherein the transport layer devices comprise customer-premises equipment (CPE),
wherein when the computing device is stationary: a S5 bearer is established to provide connectivity between the base station and the gateway, Link Layer Control (LLC) as defined for Media Access Control (MAC) is employed, and Packet Data Convergence Protocol (PDCP) stack, Radio Link Control (RLC) stack, and Timing alignment signalling are avoided, thereby optimizing network resources in the communication network.

2. The system of claim 1, wherein the connection established between the computing device and the base station is a wired or a wireless connection.

3. The system of claim 1, wherein the base station is an eNodeB.

4. A method for optimizing communication between a computing device and a gateway, said method comprising the steps of:
establishing, by means of a Mobility Management Entity (MME), a connection between the computing device and a base station, wherein the computing device is equipped with a subscriber identification module (SIM);
authenticating, at the MME, the computing device, based on an access key to authenticate user access control and to access a communication network, wherein the access key is a unique identifier of the computing device, wherein the connectivity of the computing device is checked through information received from the base station to which the computing device is connected; and creating, using the MME, an Evolved Packet System (EPS) bearer between the computing device and the gateway based on successful authentication of the computing device, to optimize communication therebetween, wherein a bandwidth is provisioned on-demand for the computing device,
wherein the EPS bearer includes a tunnel between the computing device and the base station for transmitting data, and wherein when the computing device is stationary: a S5 bearer is established to provide connectivity between the base station and the gateway, Link Layer Control (LLC) as defined for Media Access Control (MAC) is employed, and Packet Data Convergence Protocol (PDCP) stack, Radio Link Control (RLC) stack, and Timing alignment signalling are avoided, thereby optimizing network resources in the communication network, wherein the base station is configured to connect the gateway via transport layer devices, wherein the transport layer devices comprise customer-premises equipment (CPE).

5. The method of claim 4, wherein the gateway is any or a combination of a Serving Gateway (SGW) and a Packet Data Network Gateway (PGW).

6. A Mobility Management Entity (MME) configured in a LTE network, wherein the MME comprises one or more processors coupled with a memory, the memory storing instructions executable by the one or more processors to:
    establish a connection between a computing device and a base station, wherein the computing device is equipped with a subscriber identification module (SIM);
    authenticate the computing device based on an access key to authenticate user access control and to access a communication network, wherein the access key is a unique identifier of the computing device, wherein the connectivity of the computing device is checked through information received from the base station to which the computing device is connected; and
    create an Evolved Packet System (EPS) bearer between the computing device and a gateway based on successful authentication of the computing device, wherein the EPS bearer, optimizes communication therebetween, wherein a bandwidth is provisioned on-demand for the computing device,
wherein the EPS bearer includes a tunnel between the computing device and the base station for transmitting data, and wherein when the computing device is stationary: a S5 bearer is established to provide connectivity between the base station and the gateway, Link Layer Control (LLC) as defined for Media Access Control (MAC) is employed, and Packet Data Convergence Protocol (PDCP) stack, Radio Link Control (RLC) stack, and Timing alignment signalling are avoided, thereby optimizing network resources in the communication network, wherein the base station is configured to connect the gateway via transport layer devices, wherein the transport layer devices comprise customer-premises equipment (CPE).

7. The MME of claim 6, wherein the MME is configured to enable user access control.

8. The system of claim 1, wherein the system is configured to:
    receive a paging message containing voice/data for the computing device; and
    obtain information of the base station to which the computing device is connected in order to send the paging message,
    wherein physical connection of the computing device is checked by detecting a loss of signal at the base station.

* * * * *